United States Patent Office 3,547,728
Patented Dec. 15, 1970

3,547,728

METHOD FOR BONDING RIM BANDS TO TELEVISION PICTURE TUBES

Clifford V. Wittenwyler, Union, N.J., assignor to Shell Oil Company, New York, N.Y., a corporation of Delaware No Drawing. Filed Dec. 27, 1967, Ser. No. 693,718
Int. Cl. B29c *27/00*
U.S. Cl. 156—293 15 Claims

ABSTRACT OF THE DISCLOSURE

Rim bands are bonded to television picture tubes by (1) clamping the rim band in place on the tube face, forming an annular peripheral channel, (2) packing the annular space with hot inert particles (sand) coated with a polyepoxide, (3) applying a pressure enclosing means (gasketed mask) over the filed area and (4) applying and holding ammonia under pressure in said mask for a period sufficient to effect a cure of the polyepoxide.

BACKGROUND OF THE INVENTION

The implosion hazard ever-present with the use of evacuated cathode ray tubes (television picture tubes) is well known to those skilled in their manufacture and use as well as to the lay user. A multitude of techniques are employed to reduce this implosion hazard to the viewer and servicemen including bonded faceplates and metal tension bands as well as laminated "safety glass" shields and/or windows in front of the television picture tube. A current technique employed to reduce the implosion hazard comprises the filling of an annular space between a rim band and the glass tube with a polyexopide resin. While this technique is fairly effective, it does have objectionable shortcomings. For example, the operation is too time-consuming, particularly when mass production techniques are employed since the polyepoxide is quite viscous and must be "packed" into the annular space. Also, in order to achieve acceptable strength it is necessary to eliminate the number of voids which tend to exist in the epoxy system thus resulting in the consumption of additional precious time as well as a significant amount of expensive resin being employed. These shortcomings were obviated to a great extent by a method wherein inert particles are first placed in the peripheral rim channel and then the inert particles are coated with a catalyzed polyepoxide in a hydrocarbon solvent and the resin allowed to cure. This improved process is disclosed and claimed in United States copending patent application Ser. No. 527,064, filed Feb. 14, 1966. It has been desirable, however, to develop a bonding system which obviates the use of organic solvents, particularly the chlorinated solvents such as carbon tetrachloride. It has also been desirable to develop a bonding system that has a long pot life and which requires a minimum amount of binder resin.

These advantages and improvements are achieved by the instant method.

SUMMARY OF THE INVENTION

The invention relates to a process for reducing the implosion danger of television picture tubes. More particularly, the invention relates to an improved method for bonding metal bands to television picture tubes.

The present method is directed to a method of bonding metal rim bands to television picture tubes wherein the organic solvent handling and removal problems are eliminated and the total polyepoxide resin required is significantly reduced.

DESCRIPTION OF THE PREFERRED EMBODIMENT

The present invention is particularly directed to a method for minimizing the implosion danger of television picture tubes which comprises (1) placing, i.e., clamping, a metal rim band to form an annular peripheral channel on a television picture tube, (2) placing (packing) the annular peripheral channel with hot (75 to 500° F.) inert particles coated with a polyepoxide, (3) applying a pressure enclosing means (gasketed mask) over the filed area and (4) applying and holding a gaseous amine, preferably ammonia, under pressure (15–200 p.s.i.) for a period sufficient to effect a cure of the polyepoxide (5–30 minutes). Under some conditions it may be convenient or desirable to use a longer curing time. In general, effective curing times will range from about 5 minutes to 6 hours or longer; however, as noted hereinbefore the majority of cures will result after from 5 to 30 minutes.

The resin binders which are suitable for the present process include the polyepoxides. These materials are compounds possessing more than one vicinal epoxy group, i.e., more than one

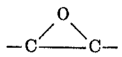

group. These compounds may be saturated or unsaturated, aliphatic, cycloaliphatic, aromatic or heterocyclic and may be substituted with substituents, such as chlorine, hydroxyl groups, alkoxy groups and the like. They may be monomeric or polymeric.

For clarity many of the polyepoxides and particularly those of the polymeric type are described in terms of epoxy equivalent values. The meaning of this expression is described in U.S. 2,633,458. The polyepoxides used in the present process are those having an epoxy equivalency greater than 1.0.

Various examples of polyepoxides that may be used in the process of the invention are given in U.S. 2,633,458 and it is to be understood that so much of the disclosure of that patent relative to examples of polyepoxides is incorporated by reference into this specification.

Other examples include the epoxidized esters of the polyethylenically unsaturated monocarboxylic acids, such as epoxidized linseed, soybean, perilla, oiticia, tung, walnut and dehydrated castor oil, methyl linoleate, butyl linoleate, ethyl 9,12 - octadecadienoate, butyl 9,12,15 - octadecatrienoate, butyl eleostearate, monoglycerides of tung oil fatty acids, monoglycerides of soybean oil, sunflower, rapeseed, hampseed, sardine, cottonseed oil, and the like.

Another group of the epoxy-containing materials used in the process of the invention include the epoxidized esters of unsaturated monohydric alcohols and polycarboxylic acids, such as, for example di(2,3-epoxybutyl) adipate, di(2,3 - epoxybutyl) oxalate, di(2,3 - epoxyhexyl) succinate, di(3,4 - epoxybutyl( maleate, di(2,3 - epoxyoctyl) pimalate, di(2,3 - epoxybutyl) phthalate, di(2,3-epoxyoctyl) tetrahydrophthalate di(4,5 - epoxydodecyl) maleate, di(2,3-epoxybutyl) terephthalate, di(2,3 - epoxypentyl) thiodipropionate, di(5,6 - epoxytetradecyl) diphenyldicarboxylate, di(3,4 - epoxyheptyl) sulfonlydibutyrate, tri (2,3 - epoxybutyl) 1,2,4 - butanetricarboxylate, di(5,6 - epoxypentadecyl)tertarate, di(4,5 - epoxytetradecyl) maleate, di(2,3 - epoxybutyl) azelate, di(3,4-epoxybutyl)citrate, di(5,6 - epoxyoctyl) cyclohexane-1,3-dicarboxylate, di(4,5-epoxyoctadecyl) malonate.

Another group of the epoxy-containing materials include those epoxidized esters of unsaturated alcohols and unsaturated carboxylic acids, such as 2,3 - epoxybutyl 3,4 - epoxypentanoate, 3,4 - epoxyhexyl 3,4-epoxypentannoate, 3,4 - epoxycyclohexyl 3,4 - epoxycyclohexanoate, 3,4 - epoxycyclohexyl 4,5 - epoxyoctanoate, 2,3 - epoxycyclohexylmethyl epoxycyclohexane carboxylate.

Still another group of the epoxy-containing materials included epoxidized derivatives of polyethylenically unsaturated polycarboxylic acids such as, for example, dimethyl 8,9,12,13 - diepoxyeiconsanedioate, dibutyl 7,8, 11,12 - diepoxyoctadecanedioate, dioctyl 10,11 - diethyl-8,9,12,13 - diepoxyeicosanedioate, dihexyl 6,7,10,11 - diepoxyhexadecanedioate, didecyl 9 - epoxyethyl - 10,11-epoxyoctadecanedioate, dibutyl 3 - butyl - 3,4,5,6-diepoxycyclohexane - 1,2 - dicarboxylate, dicyclohexyl 3,4,5,6-diepoxycyclohexane - 1,2 - dicarboxylate, dibenzyl 1,2,4,5-diepoxycyclohexane - 1,2 - dicarboxylate and diethyl 5,6, 10,11-diepoxyoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13 - eicosadienedioic acid with ethylene glycol, the polyester obtained by reacting diethylene glycol with 2 - cyclohexane - 1,4 - dicarboxylic acid and the like, and mixtures thereof.

Still another group comprises the epoxidized polyethylenically unsaturated hydrocarbons, such as epoxidized 2, 2 - bis(2 - cyclohexenyl) propane, epoxidized vinyl cyclohexane and epoxidized dimer of cyclopentadiene.

Another group comprises the epoxidized polymers and copolymers of diolefins, such as butadiene. Examples of this include, among others, butadieneacrylonitrile copolymers (Hycar rubbers), butadiene-styrene copolymers and the like.

The polyepoxides that are particularly preferred for use in the compositions of the invention are the liquid glycidyl ethers and particularly the glycidyl ethers of polyhydric phenols and polyhydric alcohols. The glycidyl ethers of polyhydric phenols are obtained by reacting epichlorohydrin with the desired polyhydric phenols in the presence of alkali. Polyether A and Polyether B described in above noted U.S. 2,633,458 are good examples of polyepoxides of this type.

Other preferred polyepoxides include the condensation products of epichlorohydrin and aliphatic polyols such as glycerine. A preferred polyepoxide of this type is a mixture of branched di- and tri-epoxides made by the condensation of epichlorohydrin and glycerine and having an epoxide equivalent weight of from about 140–160 and an average molecular weight of from about 300 to 350.

Other suitable polyepoxides include the 3,4-epoxycyclohexylmethyl 3,4-epoxycyclohexane carboxylates which are, in general, free of any functional groups other than epoxy.

Preferably such diepoxides may be represented by the structural formula:

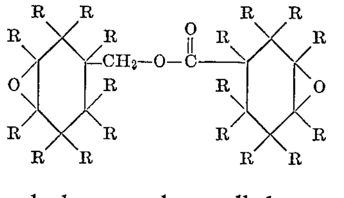

wherein R is a hydrogen or lower alkyl group, preferably from 1 to 5 carbon atoms.

These diepoxides may be easily prepared by the action of peracetic acid and unsaturated cycloaliphatic ester such as 3-cyclohexexylmethyl 3-cyclohexenecarboxylate. These unsaturated cycloaliphatic esters are also readily prepared by subjecting selected cyclic unsaturated aldehydes to the Tischenko reaction in the presence of an aluminum alkoxide catalyst. The 3,4-epoxycyclohexylmethyl 3,4-epoxycyclohexanecarboxylates obtainable by this procedure include 3,4-epoxycyclohexylmethyl 3,4-epoxycyclohexanecarboxylate and the alkyl-substituted, and preferably the lower alkyl-substituted homologs thereof such as, for example, 2,4-epoxy-1-methylcyclohexylmethyl 3,4-epoxy-1-methylcyclohexanecarboxylate, 3,4-epoxy-2 or 5-methylcyclohexylmethyl 3,4-epoxy-2 or 5-methylcyclohexanecarboxylate, 3,4-epoxy - 3 - methylcyclohexylmethyl 3,4-epoxy - 3 - methylcyclohexanecarboxylate, 3,4-epoxy-4-methylcyclohexylmethyl 3,4-epoxy-4-methylcyclohexanecarboxylate, and 3,4-epoxy-6-methylcyclohexylmethyl 3,4-epoxy-6-methylcyclohexanecarboxylate.

Another class of resins providing greater strength and heat stability are the novolac resins made by condensing phenol and formaldehyde to form a resin with 2 to 20 (preferably 3–5 phenolic hydroxyl groups). The condensate is then allowed to react with epichlorohydrin to form glycidyl ethers with each free phenol group.

Another flexible resin is formed by reacting the sodium salt of dimerized C–18 fatty acids such as Empol 1022 (Emery Industries, Cincinnati, Ohio) with epichlorohydrin. As the salt is removed, a diglycidyl ester is formed. The low viscosity of these resins make them easy to handle, and the long chain between reactive sites provides high flexibility. Other acids include axelaic, suberic, and sebacic.

Still another flexible resin that can be used for improved systems is the class formed by condensing two moles of glycidyl polyether of 2,2′-bis(4-hydroxphenyl) propane and one mole of dimerized C–18 acid. The resulting product has two free terminal epoxide groups which react forming a flexible tough polymeric when amine curing agents are added.

Very suitable commercially obtainable resins include EPON® 152, EPON® 154, EPON® 871 and EPON® 872 (Shell Chemical Company).

Other very suitable epoxy resins are described in U.S. 3,219,602 and U.S. 3,219,603, issued Nov. 23, 1965.

In general, from 0.5 to 20 parts by weight of polyepoxide is mixed with from about 80 to 99.5 parts by weight of inert particles, especially sand.

Other inert particles may be utilized in the practice of the present process. In general, the inert particles should be finely divided and preferably have a mesh size varying from about 4 to 300. Suitable inert materials, include, among others, sand, crushed rocks, finely divided shells, metal powders, chips, spheres, crushed quartz, aluminum oxide, hollow glass or plastic spheres or glass fibers and finely divided resinous particles. Preferred are the minerals, especially the siliceous materials such as, for example, sand and ground rock. Especially preferred is sand. Mixtures of various types of particles may also be used.

In general, the inert particles (sand) and polyepoxide are blended by any well-known technique at a temperature from about 75° to 500° F. and at atmospheric pressure.

The curing agent is a gaseous material capable of curing epoxy compounds "Gaseous" or "vaporized" as used herein means that the curing agent is sufficiently volatile at the pressure and temperatures employed during the curing stage to result in an effective cure within 30 minutes. Preferred curing agents include the aromatic, aliphatic or cycloaliphatic amines such as ethylenediamine, diethylenetriamine, ammonia, methylamine, dimethylamine, trimethylamine. Hydrogen sulfide may also be employed. Especially preferred, because of its ease of handling, effectiveness and rapidity of cure and low cost, is anhydrous ammonia.

In general, the hot polyepoxide-wetted sand is packed in the annular, peripheral channel formed by the clamped metal band. Then a gasketed means is applied to contain the introduced vaporized curing agents under pressure. When the cure is substantially complete, the gasketed means is removed.

In general, the vaporized curing agents are admitted at temperatures from about 75° F. to about 300° F., although from about 100° F. to 200° F. is preferred. Preferably, pressures utilized are between 15 p.s.i. and 200 p.s.i., depending upon the particular curing agent employed. When ammonia is utilized, temperatures from about 75° F. to 150° F. and pressures in the order of from 15 to 150 p.s.i. are conveniently used.

Accelerators may be added to the resin to speed the cure rate. Such additives include phenols, tertiary amines, dicyandiamine and organic acids. With the use of these accelerators the reaction is sufficiently rapid to permit curing at room temperature in certain instances.

Diluents or viscosity reducers may be helpful with some high viscosity resins to get better handleability. Suitable reactive diluents include butyl glycidyl ether, styrene oxide and others. Nonreactive diluents include polyethylene glycol, polypropylene glycol, ethyl naphthalene, coal tar, pine oil, nonylphenol, dinonylphenol and xylene.

In general, up to about 25% by weight of the polyepoxide may be replaced with one or more of the above-noted reactive or non-reactive diluents or accelerators. Other additives may be added as desired such as surface tension depressants, wetting agents, solvents, coupling agents, etc.

The invention is illustrated by the following examples. The reactants, their proportions and other specific ingredients are presented as being typical. Unless otherwise specified, parts and percentages disclosed are by weight.

EXAMPLE I

Two parts by weight of glycidyl polyether of 2,2′-bis (4-hydroxyphenyl) propane having an average molecular weight of approximately 380 and an epoxide equivalent weight of about 185 (Polyether A) was blended by stirring with 98 parts by weight of silica sand having a mesh size range of from 40–200. The blend was heated to 200° F. and packed in the channel formed between a peripheral metal rim band and a television picture tube. The pressure gasketed mask was then clamped over the television tube to enclose completely the packed channel. Ammonia gas at 100° F. was then introduced into the sealed mask at 20 p.s.i. and held for 15 minutes. When the mask was removed, a lightweight, strong bond was obtained which bonded the sand, metal bond and glass tube together. The composition system retained adhesion to the glass even after thermally cycling and aging the tube.

EXAMPLE II

The procedure of Example I was substantially followed except that twelve parts of 2,2-bis(4-hydroxyphenyl)propane was dissolved in 100 parts of the resin. The sample was then cured with anhydrous ammonia in ten minutes. Related bonding and physicial properties of the casting was obtained.

EXAMPLE III

The procedure of Example I was substantially followed except that a blend of 75% by weight of Polyether A and 25% by weight of a condensation product of epichlorohydrin and glycerine having an average molecular weight of about 300, an epoxide functionality of about 2.2 and containing approximately 10% by weight of tightly bound chlorine (Polyether X) was used. This provided a lower viscosity mix which was more easily packed. A smooth, strong, bond was obtained.

EXAMPLE IV

The procedure of Example I was substantially repeated except that the ammonia was replaced with ethylenediamine or with diethylenetriamine at their boiling point. Related bonding was obtained in each instance.

EXAMPLE V 1000 g. of round silica sand with a mesh size of 40–100 was blended with 40 grams of Polyether A which was previously blended with 5 parts of Bisphenol A per hundred parts of resin and 0.5 part of a silane, β3,4(epoxycyclohexyl) ethyl trimethoxy silane, per hundred parts of resin by stirring 5 minutes with a propellor stirrer at room temperature.

The mixture at room temperature was packed into the annular space formed between the picture tube and the rim band. A gasketed enclosure was then clamped around the face of the tube and anhydrous ammonia at 2 p.s.i.g. admitted to the mixture. After remaining six hours, the gasketed enclosure was removed. The resin-sand mixture had hardened sufficiently so that the rim band was permanently fixed in place.

EXAMPLE VI

One thousand grams of round silica sand with a mesh size of 40–100 was blended with five grams (0.5%) of Polyether A which contained 11% w. of Bisphenol A. The sand was used to bond a rim band to a video tube as described in Example V except that it was cured 20 minutes at 200° F.

A similar mixture was packed into a tensile dogbone mold as described in ASTM Method C–190 and cured under the conditions given above. The tensile strength was 111 p.s.i.

EXAMPLES VII TO X

The procedure of Example VI was repeated except that the amount of resin was increased as shown in the table below:

| Percent w. resin added to sand: | Tensile strength, p.s.i. |
|---|---|
| 1 | 339 |
| 2 | 591 |
| 4 | 737 |
| 8 | 986 |

EXAMPLE XI

One thousand grams of round silica said 40–100 mesh was blended with 20 grams of an epoxy resin prepared as described in U.S. 3,219,602 wherein two moles of Polyether A are reacted with one mole of EMPOL 1014 (a viscous aliphatic, dibasic acid produced by the polymerization of unsaturated fatty acids at midmolecule and containing 1% $C_{18}$ monobasic fatty acids, 95% $C_{36}$ dibasic fatty acid and 4% $C_{54}$ tribasic fatty acid; acid value of 188–193; saponification value of 194–198 and a neutralization equivalent of 292–298) in the presence of 0.1 part of triethanolamine borate per 100 parts by weight of Polyether A. Because of the viscous nature of this resin, mixing was done at 130° F. The resulting mixture was packed at 200° F. in the annular spaces between a video tube and a protective rim band. It was cured by exposing to ammonia gas at a pressure of 100 p.s.i.g. for two minutes. The resulting mass was hard but more impact resistant than those made when using Polyether A alone.

I claim as my invention:

1. A method for bonding an implosion rim band on a television picture tube which comprises:
   (1) blending inert particles with a polyepoxide containing at least one epoxy group;
   (2) packing said blend in a channel formed by placing a metal band around the peripheral rim of a television picture tube, and
   (3) exposing said mixture to a gaseous curing agent to effect a cure of the polyepoxide.

2. A method as in claim 1 wherein the inert particles are sand.

3. A method as in claim 1 wherein the gaseous curing agent is an amine.

4. A method as in claim 1 wherein the gaseous curing agent is anhydrous ammonia.

5. A method for bonding an implosion rim band on a television picture tube which comprises:
   (1) blending from 80 to 99.5 parts by weight of inert particles with from 0.5 to 20 parts by weight of a polyepoxide containing at least one epoxy group at a temperature between about 75° F. and 300° F.;
   (2) packing said heated blend in a channel formed by placing a metal band around the peripheral rim of a television picture tube;

(3) applying a sealed enclosing means over the filed area, and (4) introducing and holding a volatile curing agent into the sealed enclosing means under a pressure of from about 15 to 500 p.s.i. for a period from about 5 minutes to six hours.

6. A method as in claim 5 wherein up to about 25% by weight of the polyepoxide is replaced with at least one of the compounds selected from the group consisting of non-reactive diluents, reactive diluents and accelerators.

7. A method as in claim 5 wherein the accelerator is 2,2-bis(4-hydroxyphenyl)propane.

8. A method as in claim 5 wherein the nonreactive diluent is polypropylene glycol.

9. A method as in claim 5 wherein the polyepoxide is a glycidyl polyether of a polyhydric compound selected from the group consisting of polyhydric alcohols and polyhydric phenols.

10. A method as in claim 9 wherein the polyepoxide is a glycidyl polyether of 2,2-bis(4-hydroxyphenyl)propane.

11. A method as in claim 10 wherein the glycidyl polyether has an average molecular weight of approximately 380 and an epoxide equivalent weight of about 185.

12. A method as in claim 9 wherein the polyepoxide is a condensation product of epichlorohydrin and glycerol having an average molecular weight of from about 300 to about 350 and an epoxide equivalent weight from about 140 to about 160.

13. A method as in claim 5 wherein the volatile curing agent is ethylenediamine.

14. A method as in claim 5 wherein the volatile curing agent is diethylenetriamine.

15. A method as in claim 5 wherein the volatile curing agent is anhydrous ammonia.

References Cited

UNITED STATES PATENTS

| | | | |
|---|---|---|---|
| 3,265,234 | 8/1966 | McGary et al. | 220—2.1 |
| 3,327,036 | 6/1967 | Bakkes | 264—128 |
| 3,386,946 | 6/1968 | Willis | 260—37 |

REUBEN EPSTEIN, Primary Examiner

U.S. Cl. X.R.

156—330; 260—37, 47; 264—128